2 Sheets--Sheet 1.
H. W. SPANG.
Circuit and Circuit-Closer for Railway-Signaling Apparatus.
No. 6,476. Reissued June 1, 1875.
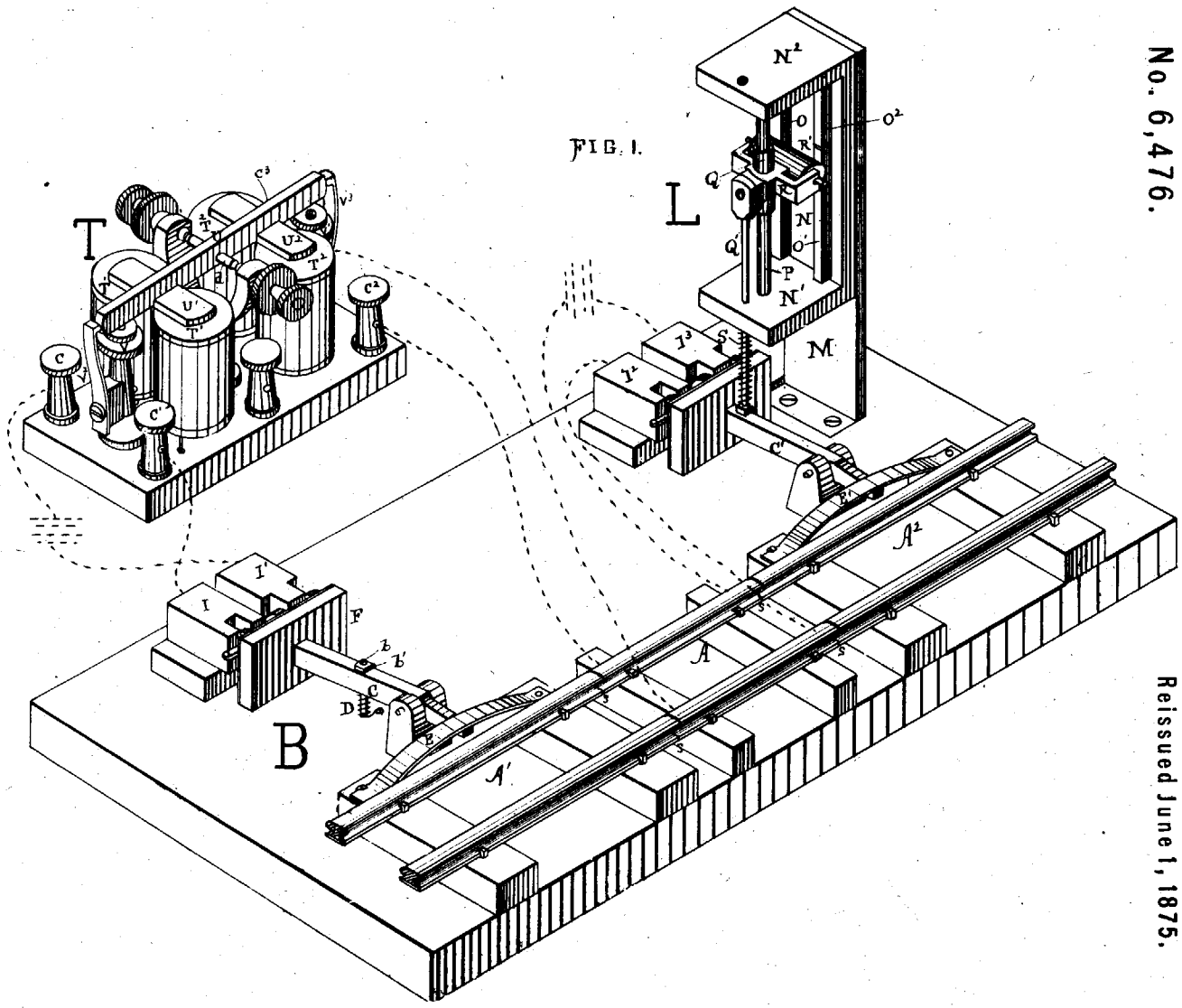
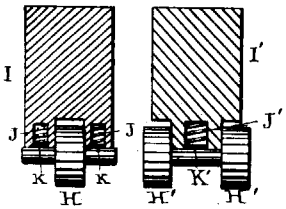
WITNESSES.
G. B. Townsend.
W. E. Chaffee
INVENTOR
Henry W. Spang,
per Wm. Beale Dale,
Attorney.

H. W. SPANG.
Circuit and Circuit-Closer for Railway-Signaling Apparatus.
No. 6,476. Reissued June 1, 1875.
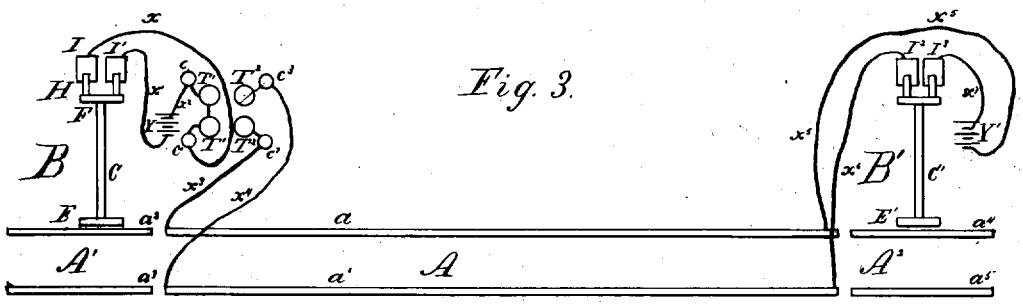
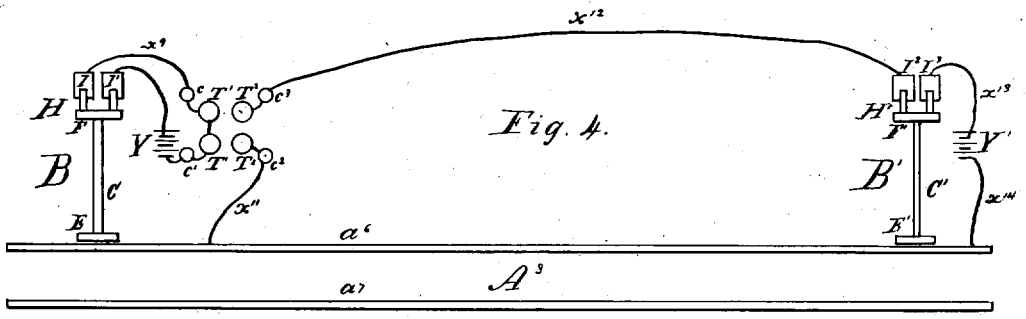
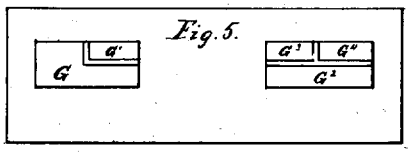
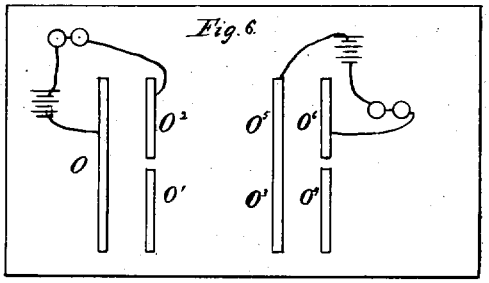
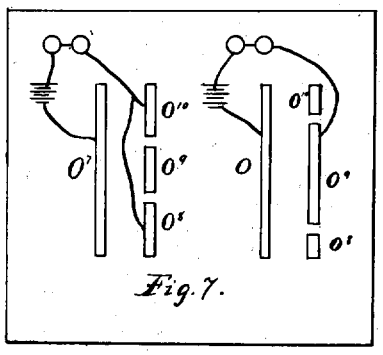
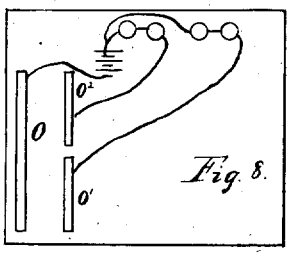
WITNESSES—
Philip W. Hale
Parker H. Sweet, Jr.
INVENTOR—
Henry W. Spang.
by Richards & Hale,
Attorneys.

UNITED STATES PATENT OFFICE.

HENRY W. SPANG, OF READING, PENNSYLVANIA.

IMPROVEMENT IN CIRCUITS AND CIRCUIT-CLOSERS FOR RAILWAY-SIGNALING APPARATUS.

Specification forming part of Letters Patent No. 142,131, dated August 26, 1873; reissue No. 6,476, dated June 1, 1875; application filed November 10, 1873.

*To all whom it may concern:*

Be it known that I, HENRY W. SPANG, of Reading, in the county of Berks and State of Pennsylvania, have invented certain Improvements in Electric Circuits and Circuit-Closers for Railway-Signal Purposes, of which the following is a specification:

The object of the invention is to prevent the collision of railway-trains, and accidents at street or railway crossings, by causing signals to be displayed or sounded when a locomotive or train is occupying a specified section of the track, or approaching a street or road crossing. It consists, first, in the combination, in a circuit-closer to be operated by a suitable pressing device or devices, of an insulated foundation having metallic conducting-pieces arranged thereon, with a metallic roller or rollers for electrically connecting the said metallic pieces, and thereby causing an electric circuit to be closed or broken, and a signal displayed or sounded, or both; second, the combination of two electro-magnets, an armature-lever with two armatures, and a spring or springs pressing against and holding the said lever in proper position, the said electro-magnets being in separate and independent circuits, and arranged to be brought into action alternately for closing and breaking a secondary or local circuit and thereby causing a signal to be displayed or sounded, or both, and afterward cease to be displayed or sounded.

The arrangement of an electro-magnet, controlling a secondary circuit and a visual or audible signal, or both, at or near one end of an insulated section of railway-track, and a galvanic battery and circuit-closer at or near the opposite end of said section, and connected with the two lines of rails of said section of track, so that the said magnet can only be charged by said battery and a safety-signal given when every pair of wheels of a locomotive or train have passed off said section of track.

In the accompanying drawing, Figure 1 is a perspective view of a section of railway-track, with my improved circuit closer and breaker near each end; also, an improved arrangement of relay electro-magnets, which can be placed at any suitable point of the section. Fig. 2 is a sectional view of the contact-rollers of my circuit closer and breaker. Fig. 3 is a plan view of a given section or length of track, which is insulated or separated from the adjacent track of same line at each end of said section, and showing a novel arrangement of electro-magnet, battery, and circuit-closer in combination therewith. Fig. 4 is a plan view of a given length or section of a single line of rails of a railway-track, said section being not insulated from the adjacent track at each end thereof, and showing my novel arrangement of electro-magnets, battery, and circuit closers and breakers connected therewith, and with a wire conductor, which forms a portion of the circuit. Fig. 5 shows views of the contact-plates or conductors on the end of a vibrating lever, forming a part of the circuit closer and breaker in one form that I propose to use. Figs. 6, 7, and 8 are views of different arrangements of the contact-plates or conductors of a vertical or upright circuit closer and breaker.

B, Fig. 1, is an electric circuit closer and breaker, which can be operated by a passing train. It is constructed as follows: C is a metallic lever, the short end of which is adjacent to and slightly above the rail, in which position it is retained by the spiral or other spring, D, acting on the under side of the opposite end of the lever. To take up the set of the spring, which it requires occasionally, on account of excessive use, a bolt, *b*, is passed through the lever and spring. Its tightening-nut *b'* bears upon the upper side. E is an arched or curved spring or yielding presser-bar on sills adjacent to the track, and projecting a suitable distance above the rail. One or both of its ends may be so attached to the sills as to allow the spring or presser bar to spread and lower under pressure. The track end of the lever C bears against the under side of bar E. The wheels of a locomotive or train ride over the spring or yielding presser-bar E, which gradually and easily spreads and lowers, and thereby depresses the track end of lever C of the circuit closer and breaker B.

To the inner end of the long arm of lever C is fixed an insulating-plate, F, to the face of which the metallic contact-plates G $G^1$ or $G^2$ $G^3$ $G^4$ are attached. They are insulated or separated from each other, as fully shown at Fig. 5. In place of the metallic plates G $G^1$ $G^3$ $G^4$, plates of ebonite or any insulating substance can be used. H H H′ H′, Fig. 2, are metallic contact-rollers in suitable bearings in the blocks or heads I $I^1$, and said blocks are insulated or separated from each other. When end of lever C, to which plate F is attached, is depressed by spring D, roller H in metallic head I is in contact with wide portion of metallic plate G, or plate $G^3$, and rollers H′ H′ in metallic head $I^1$, are in contact with plate $G^3$ or $G^4$, and circuit broken between H and H′ H′; and when said end of lever C is elevated by presser-bar E and wheel of a locomotive or car, rollers H and H′ H′ will contact with plate G or $G^2$, and close circuit between said rollers. A good contact will be made between said rollers and plate or plates by means of the springs J J′, which are recessed in the blocks I $I^1$, and exert their force on the journals of the rollers through intervening caps K K′. L is a vertical circuit closer and breaker, constructed as follows: M is an upright, upon which is fixed a plate, N, of ebonite or other insulating substance. $N^1$ $N^2$ are projections from plate N, and of similar material. A cast-iron box, lined with ebonite or other insulating material, and fixed to upright, can be used with equal effect. Upon the insulating-plate N are fixed the parallel metallic plates or conductors O $O^1$ $O^2$ or $O^3$ $O^4$ $O^5$ $O^6$, which are separated from each other, as shown in Fig. 6, and so completely insulated that very little electricity can pass between them. P is a vertical guide-rod, over or upon which moves the sleeve Q. The roller-head R, attached to the sleeve, carries the contact roller or rollers R′, which traverse the plates or rails O $O^1$ $O^2$ or $O^3$ $O^4$ $O^5$ $O^6$, and are held firmly against them by springs and caps similar to those shown in circuit-closer B.

To the sleeve Q is attached a rod, Q′, which is actuated by the lever C′, like in construction, arrangement, and mode of operation to the lever C of the circuit closer and breaker B, shown and described. Rod Q′ or sleeve Q can be actuated by any suitable means, for causing the contact-rollers to traverse the plates or rails O $O^1$ $O^2$ or $O^3$ $O^4$ $O^5$ $O^6$. A spiral spring, S, brings the connecting-rod Q′, sleeve Q, and their attendant parts back to their normal position, after pressure which has moved them therefrom has ceased. The sleeve Q may be insulated from metallic contact with the connecting-rod Q′ or the roller-head R by placing a plate of any insulating substance between them. Plates or rails of ebonite may be substituted for the metallic plates $O^1$ $O^3$ $O^4$. T, Fig. 1, is a relay-magnet, having two electro-magnets, $T^1$ $T^1$ and $T^2$ $T^2$, the terminal wires of which are connected with the binding or connecting posts $c$ $c^1$ and $c^2$ $c^3$. U is an armature-lever on the shaft $d$. It has the armatures $U^1$ $U^2$ on or near its opposite ends. V $V^1$ are posts, which regulate the extent of the vibration of the lever, and prevent its armatures from sticking on the cores of the electro-magnets. They also serve, in connection with the armature-lever, to close or break a secondary or local circuit from an additional battery, for operating or controlling a visual or audible signal, or both. $V^2$ $V^3$ are springs, which press against the lever U, and hold it in the position it is placed by an electric circuit closed temporarily, the said circuit charging one electro-magnet, $T^1$ $T^1$, and attracting the armature U′ on one end of the lever, which is held by said spring or springs in that position until another circuit is closed, and charges the opposite electro-magnet $T^2$ $T^2$, which then attracts the opposite armature $U^2$, changing the position of lever U. A, Fig. 3, is a section of railway-track, of any required length—usually one mile. It is insulated or separated from the adjacent track $A^1$ $A^2$ at each end and in the same line.

$A^3$, Fig. 4, is a section of track not insulated from, but forming a continuous metallic line with, the portions of track at each of its ends. B B′ are circuit-closers, respectively near opposite ends of sections of track A or $A^3$. T is the relay-magnet, at or near one end of said section, of either modification.

Referring to Fig. 3, the wire $x$ connects the roller-head I and the connecting-post $c^1$ of the electro-magnet $T^1$ $T^1$; wire $x^1$, the battery Y and roller-head $I^1$; wire $x^2$, the battery Y and binding-post $c$ of electro-magnet $T^1$ $T^1$; wire $x^3$, the line of rails $a$ and the binding-post $c^2$ of the electro-magnet $T^2$ $T^2$; wire $x^4$, the line of rails $a^1$ and the connecting-post $c^3$ of the electro-magnet $T^2$ $T^2$; wire $x^5$, the line of rails $a$ and the battery Y′; wire $x^6$, the line of rails $a^1$ and the roller-head $I^2$; wire $x^7$, the roller-head $I^3$ and the battery Y′.

A train, reference being had to Fig. 3, passing over the track in the direction of the arrows, the tread of the wheels depresses the spring or presser bar E, and, in consequence, the end of the lever C, which is adjacent to rail $a^2$, is depressed, and the opposite end and insulating-block elevated, and the contact-plate G or $G^2$ and the rollers H H′ H′ make contact with each other, and close the electric circuit, which, flowing from battery Y over wires $x$ $x^1$ $x^2$, the roller-heads I $I^1$, springs J J′, caps K K′, rollers H H′ H′, plate G or $G^2$, charges the electro-magnet $T^1$ $T^1$, which attracts the armature U′, and thereby causes lever U to contact with post V, and close and keep closed a secondary or local circuit, by means of which a signal may be displayed or sounded, or both, until the last car of said train has passed off the insulated section of track A, and depressed the spring or presser bar E′ and the end of lever C′ of the circuit-closer B′, which is located just beyond, or desired distance beyond, the termination of the insulated section of track, and thereby cause the electric circuit from the battery Y′ to be closed, and the current thereof to flow over wire $x^7$, circuit-closer B′, wire $x^6$, rails $a^1$, wire $x^4$, magnet $T^2$ $T^2$, wire $x^3$, rails $a$, and wire $x^5$, and charges the electro-magnet $T^2$ $T^2$, which attracts the armature $U^2$, and thereby causes lever U to contact with post $V^1$, and open and keep open the said secondary or local circuit, the result of which is that the signal ceases to be displayed or sounded. No electrical communication can be had between the magnet $T^2$ $T^2$ and battery Y′, at opposite ends of the insulated section of track, so long as a train or locomotive or car is on said section, because the metallic wheels and axles form complete metallic circuits, in connection with the rails, and of course the electrical circuit of battery Y′ will be completed at, and not extend beyond, the first pair of metallic wheels and axle in the direction of its flow. For this reason the circuit closer and breaker B′ is located so that it is operated only after the last car of the train has passed off said insulated section of track.

As shown in Fig. 4, the electric circuit from battery Y′ is completed by passing over wires $x^{11}$ $x^{12}$ $x^{13}$ $x^{14}$, line of rails $a^6$, and the circuit-closer B′, as and for the purpose hereinbefore explained.

In Fig. 3 the two lines of rails $a$ $a^1$ form the principal portion of the conductors of the electrical circuit between battery Y′ at one end and the electro-magnet $T^2$ $T^2$ at the opposite end of the insulated section of track, and in Fig. 4 the line-wire $x^{12}$ and one line, $a^6$, of the rails form the principal portion of the conductors of the electrical circuit between battery Y′ at one end and the electro-magnet $T^2$ $T^2$ at the opposite end of section of track $A^3$.

The line-wire or other conductor $x^{12}$ can be attached to insulators on poles, or insulated and laid in the earth.

Instead of the devices shown and described in Figs. 3 and 4 for closing circuit, any other suitable devices may be substituted, and be operated by a locomotive or car or person.

Section of rails $a$ and $a^1$, Fig. 3, and $a^6$, Fig. 4, should each have metallic continuity throughout its length by the ends of the component rails being connected by suitable metallic connections or conductors.

Instead of connecting wires $x^{11}$ and $x^{14}$, Fig. 4, to line of rails $a^6$, they can terminate in, and form connection with, the earth.

Fig. 6 shows the arrangement of the battery, electro-magnet, and the wires in connection with the metallic plates or conductors O $O^1$ $O^2$ or $O^3$ $O^4$ $O^5$ $O^6$ of the upright circuit closer and breaker L. When the roller R′, or its equivalent—viz., two rollers connected by a conducting-axle, as shown at H′ H′ of the roller-head $I^1$, Fig. 1—rests upon the plates or rails O $O^1$ or $O^3$ $O^4$, the electric circuit is broken, and when upon the plates O $O^2$ or $O^5$ $O^6$ the electric circuit is closed. The vertical circuit closer and breaker can also be placed in a horizontal position, and be used for railway-switch signal, or other signal or alarm purposes, by arranging it so that the rod Q′ will be actuated by a switch lever or rod or other device. Upon the ebonite plate N metallic rails or conductors can be fixed, as shown at $O^7$ $O^8$ $O^9$ $O^{10}$, Fig. 7, for a three-throw switch.

Fig. 8 shows the arrangement of the battery with plates O $O^1$ $O^2$ and two electro-magnets, and arranged for changing from one circuit to another.

The spring or presser bar E can be used in connection with any other contrivance for closing or breaking an electric circuit, and thereby operating an electro-magnetic signal or alarm apparatus.

Having now fully described the construction and operation of my invention, I claim—

1. The combination, in a circuit closer, breaker, or changer, operated by a suitable pressure device, of an insulating-foundation having metallic conducting-pieces arranged thereon, and a metallic roller or rollers for electrically connecting the same, substantially as set forth.

2. The metallic plates or rails O $O^1$ $O^2$ or $O^3$ $O^4$ $O^5$, or $O^7$ $O^8$ $O^9$ $O^{10}$, in combination with the insulating-plate N, guide-rod P, sleeve Q, roller-head R, roller or rollers R′, as and for the purpose set forth.

3. The combination of curved spring or yielding presser-bar E, detached lever C, and a circuit-closer having an insulated foundation with metallic roller or rollers, for electrically connecting the same for closing an electric railway-signal circuit, as set forth.

4. The combination of the electro-magnets $T^1$ $T^1$ $T^2$ $T^2$, armature-lever U, armatures $U^1$ $U^1$, and springs $V^2$ $V^3$, one or both, substantially as described.

5. The combination of the two lines of rails $a$ $a^1$ of insulated section A of railway-track, electro or relay magnet $T^2$ $T^2$, controlling a secondary circuit and electric railway-signal apparatus, and connected with said lines of rails at one end of said section of track, and a circuit closer and breaker and battery located beyond the opposite end of said section of track, and connected with said lines of rails thereof at said opposite end, as and for the purpose set forth.

6. The combination of electro-magnet $T^1$ $T^1$, battery Y, and circuit closer and breaker B with electro-magnet $T^2$ $T^2$, connected with lines of rails $a$ $a^1$ of insulated section A of railway-track at one end thereof, and battery Y′ and circuit closer and breaker B′, located beyond and connected with said lines of rails at the opposite end thereof, as and for the purpose set forth.

7. The combination of an insulated section of railway-track, the respective lines of rails of which are in continuous metallic connection, an electro-magnet having its terminals connected respectively to opposite lines of rails of said section at one end thereof, a galvanic battery having one of its poles connected to one line of rails of said section at the opposite end thereof, and its other pole connected with a circuit-closer, which is electrically connected with the other line of rails at said opposite end of the section, substantially as and for the purpose set forth.

In testimony whereof I hereunto sign my name in the presence of two subscribing witnesses.

HENRY W. SPANG.

Witnesses:
DANIEL SPANG,
ISAAC SPANG.